US012659181B1

(12) United States Patent
Sheppert

(10) Patent No.: US 12,659,181 B1
(45) Date of Patent: Jun. 16, 2026

(54) METHOD AND PROCESS FOR THE SECURE EXTERNAL VALIDATION OF BLOCKCHAIN ADDRESSES USING A COMPUTER PROGRAM

(71) Applicant: Alexander Pearson Sheppert, Vancouver, WA (US)

(72) Inventor: Alexander Pearson Sheppert, Vancouver, WA (US)

( * ) Notice: Subject to any disclaimer, the term of this patent is extended or adjusted under 35 U.S.C. 154(b) by 180 days.

(21) Appl. No.: 18/376,755

(22) Filed: Oct. 4, 2023

Related U.S. Application Data

(60) Provisional application No. 63/413,162, filed on Oct. 4, 2022.

(51) Int. Cl.
*H04L 9/00* (2022.01)
*H04L 9/06* (2006.01)

(52) U.S. Cl.
CPC .............. *H04L 9/50* (2022.05); *H04L 9/0643* (2013.01)

(58) Field of Classification Search
CPC ................................. H04L 9/50; H04L 9/0643
See application file for complete search history.

(56) References Cited

U.S. PATENT DOCUMENTS

| | | | |
|---|---|---|---|
| 2017/0171172 A1* | 6/2017 | Sullivan ................. | G06F 21/33 |
| 2021/0158353 A1* | 5/2021 | Yang ..................... | G06Q 20/02 |
| 2022/0103378 A1* | 3/2022 | Unger ................... | H04L 9/3239 |

* cited by examiner

*Primary Examiner* — Mohamed A. Wasel

(74) *Attorney, Agent, or Firm* — White-Welker & Welker, LLC; Matthew T. Welker, Esq.

(57) ABSTRACT

A method for creating a unique passphrase on the front-end that can be verified uniquely on-chain. Checking a user's credentials off-chain to see if the user is on the off-chain whitelist. Checking to see if the user has a "verifying" wallet whose secret-key is only known to the front-end program. Hash the user's public address and sign that hash as if it were a transaction using the verifying wallet. Create a passcode. Pass the code as an argument to the on-chain function. Have the public-key of the "verifying wallet" known to the blockchain smart contract. Using encryption verify that the signed hash was signed by the private-key of the verifying wallet using ECDSA. Hash the user's/function caller's address on-chain. Verify that the hash from the signed hash sent matches the hash of the user's address that was created on chain. Verify the user securely.

7 Claims, 3 Drawing Sheets

Check the user's credentials off-chain, see if they are on the off-chain whitelist, saving 100% of gas.
301

Have a "verifying" wallet whose secret-key is only known to the front-end program
302

Hash the user's public address
303

Sign that hash as if it were a transaction using the verifying wallet
304

Creating a unique and verifiable passcode
305

Passing the unique code as an argument to the on-chain function
306

Have the public-key of the "verifying wallet" known to the blockchain smart contract
307

Via sha-256 or other encryption method verify that the signed hash was signed by the private-key of the verifying wallet using ECDSA or other cryptographic methods
308

Hash the user's/function caller's address on-chain
309

Reverse engineer/ use ECDSA / use rsv to verify that the hash from the signed hash sent matches the hash of the user's address that was created on chain
310

Successfully verify the user securely, and without having to keep any sort of expensive on chain ledger
311

```
Off-Chain code example using the ethers.js module and sha-256:

var ethers = require("ethers");

//verfier private key
const private_key =
        "<your private key for verification>";

//address that you want to whitelist
var address = "<your address to whitelist>";

//turn the address into a hash
var checksum_address = ethers.utils.getAddress(address);
hash = ethers.utils.keccak256(checksum_address);

//turns the hash into an array
array_hash = ethers.utils.arrayify(hash);
```

Fig. 1

```
Off-Chain code example using the ethers.js module and sha-256:

var ethers = require("ethers");

//verfier private key
const private_key =
        "<your private key for verification>";

//address that you want to whitelist
var address = "<your address to whitelist>";

//turn the address into a hash
var checksum_address = ethers.utils.getAddress(address);
hash = ethers.utils.keccak256(checksum_address);

//turns the hash into an array
array_hash = ethers.utils.arrayify(hash);

//sign the hash with verifier
let wallet = new ethers.Wallet(private_key);

let signing_key = wallet.signMessage(array_hash);

//the signedMessage to allow whitelist to work
console.log(signing_key);
```

Fig. 2

Figure 3:
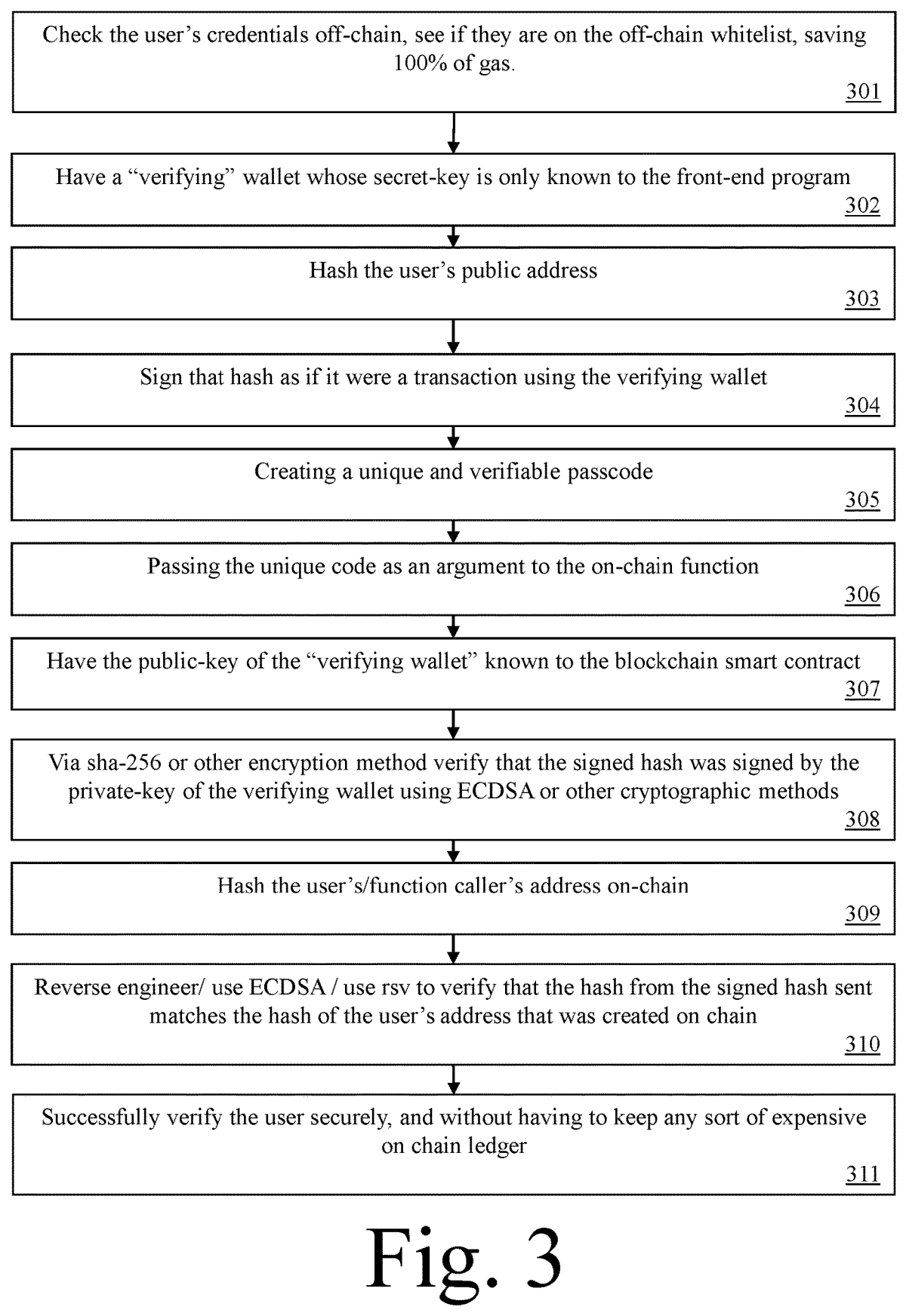

Check the user's credentials off-chain, see if they are on the off-chain whitelist, saving 100% of gas.

301

Have a "verifying" wallet whose secret-key is only known to the front-end program

302

Hash the user's public address

303

Sign that hash as if it were a transaction using the verifying wallet

304

Creating a unique and verifiable passcode

305

Passing the unique code as an argument to the on-chain function

306

Have the public-key of the "verifying wallet" known to the blockchain smart contract

307

Via sha-256 or other encryption method verify that the signed hash was signed by the private-key of the verifying wallet using ECDSA or other cryptographic methods

308

Hash the user's/function caller's address on-chain

309

Reverse engineer/ use ECDSA / use rsv to verify that the hash from the signed hash sent matches the hash of the user's address that was created on chain

310

Successfully verify the user securely, and without having to keep any sort of expensive on chain ledger

METHOD AND PROCESS FOR THE SECURE EXTERNAL VALIDATION OF BLOCKCHAIN ADDRESSES USING A COMPUTER PROGRAM

SEQUENCE LISTING OR PROGRAM

Not Applicable

TECHNICAL FIELD OF THE INVENTION

The present invention relates in general to digital content and data authentication and providing verification. More specifically, the present invention relates to whitelists on blockchain applications which require secure external validation.

BACKGROUND OF THE INVENTION

Many blockchain applications make use of "whitelists." A whitelist is simply a list of crypto addresses that are allowed to access a smart contract or run a blockchain function. The most common use of whitelists are NFT projects that create a "whitelist" of users who will be able to mint the NFT at a discount.

The "whitelist" is stored on the blockchain, typically with a mapping function: <solidity>
mapping(address=>bool) private_whitelist;
And when somebody is trying to mint during the presale or for a discount, the whitelist is checked and throws an error if the person intending to mint is not on the whitelist. <solidity>
function presaleMintItems(uint256 amount) public payable {
require(_whitelist[_msgSendero], "Mint: Unauthorized Access");
/mint the item
}
Storing anything on the blockchain is expensive, because it must be written to however many computers are verifying the chain. For example, ETHEREUM currently has tens of thousands of nodes across the world. Right now, writing somebody's address to a whitelist costs around $4 per address. The cost varies wildly from chain to chain and by gas prices. Many projects end up paying more than $10,000 to add a whitelist to the blockchain.

Many people have tried to code a method that keeps the whitelist off-chain, and on the frontend controls who is able to mint. They can sometimes accomplish this by assuming that everybody who mints will do so from their website. They write a javascript function that sends a mint request to the smart contract, but only if their address is in the whitelist. Due to the public nature of blockchain code a nefarious individual can send a mint request directly to the smart contract and bypass front-end verification.

Another tried solution is to have people log-in with their wallets on the front end exclusively, and then have the company send the mint request to the blockchain only if the user is frontend verified. While this saves money and the need to write the whitelist to the blockchain, the company is now stuck paying all of the users' gas fees, which defeats the purpose.

Another solution tried by the Inventor was for the front-end to send a hashed/signed passcode as a second parameter with the mint amount, and to verify that passcode on chain with sha-256 encryption. While this works once, after the hashed passcode is sent any hacker can decrypt the successful transaction to find the non-unique hash and use it to verify himself.

Therefore what is needed is a unique passphrase on the front-end that can be verified uniquely on-chain.

DEFINITIONS

Blockchain is a system of recording information in a way that makes it difficult or impossible to change, hack, or cheat the system. A blockchain is essentially a digital ledger of transactions that is duplicated and distributed across the entire network of computer systems on the blockchain.

A blockchain address is a form of identification, usually comprising a sequence of alphanumeric characters unique to a specific user.

A blockchain address is like a bank account for crypto assets. Every address is unique and they are 26-35 alphanumeric characters in length. They are generated from the private key, which is required to send or receive data from one address to another.

A blockchain wallet is a digital wallet that allows users to store, manage, and trade their cryptocurrencies.

Elliptic Curve Digital Signature Algorithm, or ECDSA, is one of the more complex public key cryptography encryption algorithms. Keys are generated via elliptic curve cryptography that are smaller than the average keys generated by digital signing algorithms.

Ethers. js is a JavaScript library that allows developers to interact with the Ethereum blockchain. The library includes utility functions in JavaScript and TypeScript, and has all the capabilities of an Ethereum wallet.

Front end development is a style of computer programming that focuses on the coding and creation of elements and features of a website that will then be seen by the user. It's about making sure the visual aspects of a website are functional. You can also think of front end as the "client side" of an application.

NFTs (non-fungible tokens) are unique cryptographic tokens that exist on a blockchain and cannot be replicated.

Off chain code: All code that is run by the wallet before sending the transaction. This code will construct the valid (or invalid) transaction to be send.

On chain code: All code that is executed by the nodes at validation time (UTXO validator script or monetary policy).

OPENZEPPELIN is an open-source framework to build secure smart contracts.

OPENZEPPELIN provides a complete suite of security products and audit services to build, manage, and inspect all aspects of software development and operations for decentralized applications.

SHA-2 (Secure Hash Algorithm 2) is a set of cryptographic hash functions designed by the United States National Security Agency (NSA) and first published in 2001. They are built using the Merkle-Damgird construction, from a one-way compression function itself built using the Davies-Meyer structure from a specialized block cipher.

A whitelist is a list of crypto addresses that are allowed to access a smart contract or run a blockchain function

SUMMARY OF THE INVENTION

The present invention is a method for creating a unique passphrase on the front-end that can be verified uniquely on-chain.

The first step is to check a user's credentials off-chain to see if the user is on the off-chain whitelist. Next, check to see if the user has a "verifying" wallet whose secret-key is only known to the front-end program. Hash the user's public address and sign that hash as if it were a transaction using the verifying wallet. Creating a unique and verifiable passcode. Passing the unique code as an argument to the on-chain function. Have the public-key of the "verifying wallet" known to the blockchain smart contract. Using Via sha-256 or other encryption method verify that the signed hash was signed by the private-key of the verifying wallet using ECDSA or other cryptographic methods. Hash the user's/ function caller's address on-chain. Reverse engineer/use ECDSA/use rsv to verify that the hash from the signed hash sent matches the hash of the user's address that was created on chain. Finally, Successfully verify the user securely, and without having to keep any sort of expensive on chain ledger.

BRIEF DESCRIPTION OF THE DRAWINGS

The accompanying drawings, which are incorporated herein and form a part of the specification, illustrate the present invention and, together with the description, further explain the principles of the invention and to enable a person skilled in the pertinent art to make and use the invention.

FIG. 1 is an illustrative sample of on-chain code using the open zeppelin ECDSA module and sha-256 encryption enabling the method and process of the present invention.

FIG. 2 is an illustrative sample of off-chain code using the ethers.js module and sha-256 encryption enabling the method and process of the present invention.

FIG. 3 is a flow chart illustrating the method for creating a unique passphrase on the front-end that can be verified uniquely on-chain as taught by the present invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figure, it is possible to see the various major elements constituting the apparatus of the present invention.

The present invention is a method and process for the secure external validation of blockchain addresses using a computer program. The present invention teaches a method of creating a unique passphrase on the front-end that can be verified uniquely on-chain. The unique passphrase on the front-end has more uses than simply whitelisting, but that's the current easiest implementation.

Creating a unique passphrase on the front-end that can be verified uniquely on-chain accomplished by the following methodology and steps discussed below and illustrated in FIG. 3: The first step is to check a user's credentials off-chain to see if the user is on the off-chain whitelist 301. Next, check to see if the user has a "verifying" wallet whose secret-key is only known to the front-end program 302. Hash the user's public address 303 and sign that hash as if it were a transaction using the verifying wallet 304. Creating a unique and verifiable passcode 305. Passing the unique code as an argument to the on-chain function 306. Have the public-key of the "verifying wallet" known to the blockchain smart contract 307. Using Via sha-256 or other encryption method verify that the signed hash was signed by the private-key of the verifying wallet using ECDSA or other cryptographic methods 308. Hash the user's/function caller's address on-chain 309. Reverse engineer/use ECDSA/use rsv to verify that the hash from the signed hash sent matches the hash of the user's address that was created on chain 310. Finally, Successfully verify the user securely, and without having to keep any sort of expensive on chain ledger 311.

Now referring to FIG. 1, an on-Chain code example using the open zeppelin ECDSA module and sha-256 encryption is illustrated.

FIG. 2 illustrates an off-Chain code example using the ethers.js module and sha-256. This can be accomplished with other libraries, by writing assembly yourself, or using any number of coding languages; however, the unique off-chain double-hash and the on-chain hash-identification is the key to enabling the method taught by the present invention.

The software system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Thus, it is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A computer implemented method for the secure external validation of blockchain addresses, the method comprising:

running and executing an application delivering a blockchain wallet on an electronic device;

checking a user's credentials off-chain to see if the user is on the off-chain whitelist;

checking to see if the user has a "verifying" wallet whose secret-key is only known to the front-end program;

hash the user's public address and sign that hash as if it were a transaction using the verifying wallet;

creating a unique and verifiable passcode;

passing the unique code as an argument to the on-chain function;

have the public-key of the "verifying wallet" known to the blockchain smart contract;

using Via sha-256 or other encryption method to verify that the signed hash was signed by the private-key of the verifying wallet using an Elliptic Curve Digital Signature Algorithm (ECDSA) or other cryptographic methods;

hash the user's/function caller's address on-chain;

reverse engineer/use ECDSA/use a first signature component (r), a second signature component (s), and a recovery identifier (v), collectively referred to as RSV to verify that the hash from the signed hash sent matches the hash of the user's address that was created on chain; and successfully verify the user securely, and without having to keep any sort of expensive on chain ledger;

applied to an on-Chain code using the open zeppelin ECDSA module and sha-256;

comprising the following steps of:

importing the open zeppelin contracts and ECDSA;

verifying the library using ECDSA for bytes32; and verifying the Account With Signature and hash address.

2. The method of claim 1, wherein the method is accomplished with other libraries.

3. The method of claim 1, wherein the method is accomplished by writing assembly.

4. The method of claim 1, wherein the method is accomplished using any number of coding languages.

5. The method of claim 1, wherein the unique on-chain hash-identification is the key to enabling the method taught by the present invention.

6. A computer implemented method for the secure external validation of blockchain addresses, the method comprising:

running and executing an application delivering a blockchain wallet on an electronic device;

checking a user's credentials off-chain to see if the user is on the off-chain whitelist;

checking to see if the user has a "verifying" wallet whose secret-key is only known to the front-end program;

hash the user's public address and sign that hash as if it were a transaction using the verifying wallet;

creating a unique and verifiable passcode;

passing the unique code as an argument to the on-chain function;

have the public-key of the "verifying wallet" known to the blockchain smart contract;

using Via sha-256 or other encryption method verify that the signed hash was signed by the private-key of the verifying wallet using ECDSA or other cryptographic methods;

hash the user's/function caller's address on-chain;

reverse engineer/use ECDSA/use a first signature component r), a second signature component (s), and a recovery identifier (v), collectively referred to as RSV to verify that the hash from the signed hash sent matches the hash of the user's address that was created on chain; and successfully verify the user securely, and without having to keep any sort of expensive on chain ledger;

applied to an off-Chain code using the ethers.js module and sha-256;

comprising the following additional steps of:

constructing a private key for verification;

verifying the private key;

creating or selecting an address for whitelisting;

turning the address into a hash;

turning the hash into an array;

signing the hash with a verifier;

creating a signing key; and the signed message allows the whitelist to work.

7. The method of claim 6, wherein the unique off-chain double-hash is the key to enabling the method taught by the present invention.

* * * * *